US009075693B2

(12) United States Patent
Sporkert et al.

(10) Patent No.: US 9,075,693 B2
(45) Date of Patent: Jul. 7, 2015

(54) METHODS FOR UPDATING APPLICATIONS

(71) Applicant: Google Inc., Mountain View, CA (US)

(72) Inventors: Tilman Sporkert, Cupertino, CA (US);
Andrew Devron Stadler, San Francisco, CA (US); Ficus Kirkpatrick, San Francisco, CA (US); Ilya Firman, San Mateo, CA (US); Christian Sonntag, San Francisco, CA (US)

(73) Assignee: Google Inc., Mountain View, CA (US)

( * ) Notice: Subject to any disclaimer, the term of this patent is extended or adjusted under 35 U.S.C. 154(b) by 9 days.

(21) Appl. No.: 13/647,097

(22) Filed: Oct. 8, 2012

(65) Prior Publication Data

US 2014/0007075 A1   Jan. 2, 2014

Related U.S. Application Data

(60) Provisional application No. 61/665,255, filed on Jun. 27, 2012.

(51) Int. Cl.
G06F 9/44 (2006.01)
G06F 9/445 (2006.01)

(52) U.S. Cl.
CPC ... G06F 8/68 (2013.01); G06F 8/65 (2013.01); G06F 8/60 (2013.01)

(58) Field of Classification Search
None
See application file for complete search history.

(56) References Cited

U.S. PATENT DOCUMENTS

| 6,493,871 | B1 * | 12/2002 | McGuire et al. | 717/173 |
| 6,526,574 | B1 * | 2/2003 | Jones | 717/168 |
| 7,194,728 | B1 | 3/2007 | Sirota et al. | |
| 7,661,102 | B2 | 2/2010 | Ogle | |
| 7,665,081 | B1 | 2/2010 | Pavlyushchik | |
| 7,958,502 | B2 | 6/2011 | Motta et al. | |
| 8,677,346 | B1 * | 3/2014 | Griffin et al. | 717/174 |
| 8,756,195 | B2 * | 6/2014 | Page et al. | 707/638 |
| 8,799,888 | B1 * | 8/2014 | Fitzgerald et al. | 717/170 |
| 2002/0099726 | A1 | 7/2002 | Crudele et al. | |
| 2002/0147849 | A1 * | 10/2002 | Wong et al. | 709/246 |
| 2003/0182414 | A1 * | 9/2003 | O'Neill | 709/223 |
| 2003/0220944 | A1 | 11/2003 | Lyman Schottland et al. | |
| 2005/0022175 | A1 | 1/2005 | Sliger et al. | |

(Continued)

OTHER PUBLICATIONS

Gkantsidis, C., et al., Planet Scale Software Updates, Proceedings of the 2006 conference on Applications, technologies, architectures, and protocols for computer communications, 2006, pp. 423-434, [retrieved on Feb. 24, 2015], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Morris & Kamlay LLP

(57) ABSTRACT

A method includes receiving, from a remote computing device, an update request, the update request including a first signature corresponding to a client-side application package that is stored at the remote computing device. The method also includes identifying a first server-side application package using the first signature. The method also includes generating a differential update package using the first server-side application package and a second server-side application package as inputs, wherein the differential update package, when applied to the client side application package, is operable to modify to the client-side application package such that it is functionally equivalent to the second server-side application package.

12 Claims, 7 Drawing Sheets

(56) References Cited

U.S. PATENT DOCUMENTS

| | | | |
|---|---|---|---|
| 2005/0027758 A1 | 2/2005 | Meller et al. | |
| 2006/0112113 A1 | 5/2006 | Gu et al. | |
| 2007/0169073 A1* | 7/2007 | O'Neill et al. | 717/168 |
| 2008/0098383 A1 | 4/2008 | Waldmann | |
| 2008/0295087 A1* | 11/2008 | Kang et al. | 717/168 |
| 2009/0007090 A1 | 1/2009 | Hirao et al. | |
| 2009/0017812 A1 | 1/2009 | Chan et al. | |
| 2010/0325622 A1 | 12/2010 | Morton | |
| 2011/0010701 A1 | 1/2011 | Cooper et al. | |
| 2011/0093839 A1* | 4/2011 | Murase | 717/168 |
| 2013/0111458 A1* | 5/2013 | Quin et al. | 717/172 |

OTHER PUBLICATIONS

Hunt, J., et al., Delta Algorithms: An Empirical Analysis, ACM Transactions on Software Engineering and Methodology, vol. 7 Issue 2, Apr. 1998, pp. 192-214, [retrieved on Feb. 24, 2015], Retrieved from the Internet: <URL:http://dl.acm.org/>.*

European Patent Office, Extended Search Report for EP 13 173 892.4, Oct. 17, 2013.

Wikipedia, Windows Update, en.wikipedia.org, Jun. 3, 2012, pp. 1-7, XP055083262, Retrieved from the Internet: URL:http://en.wikipedia.orgjw/index.php?title=Windows Update&oldid=495815677.

* cited by examiner

METHODS FOR UPDATING APPLICATIONS

CROSS-REFERENCE TO RELATED APPLICATIONS

This application claims the benefit of U.S. Provisional Patent Application No. 61/665,255, which was filed on Jun. 27, 2012.

BACKGROUND

Mobile computing devices such as mobile telephones, tablets, and laptop computers have proliferated in recent years. These devices can be equipped with processors, memory, and the capability to communicate through local and wide area networks, including the Internet. These devices can be equipped with operating systems which permit the devices to execute a wide range of computer programs, typically called "apps." The user of a mobile computing device can download computer programs and other content by direct communication with a server through a mobile telephone network or wireless local area network.

App authors issue updates for apps from time to time. Over the life cycle of a typical app, multiple updates might be issued by the author. One method for updating an application is to obtain, for example, by downloading from a server to the mobile device, a complete copy of the updated application. The outdated version of the application is then replaced with the updated version. Because a complete copy of the updated application is transmitted from a server to the mobile device, the bandwidth costs associated with this transmission are based on the size of the complete copy of the updated application, regardless of the extent of the changes that were made to the application in the updated version as compared to the version that is being replaced.

SUMMARY

The disclosure relates to methods for updating applications.

One aspect of the disclosed embodiments is a method that includes receiving, from a remote computing device, an update request, the update request including a first signature corresponding to a client-side application package that is stored at the remote computing device. The method also includes identifying a first server-side application package using the first signature. The method also includes generating a differential update package using the first server-side application package and a second server-side application package as inputs. The differential update package, when applied to the client side application package, is operable to modify to the client-side application package such that it is functionally equivalent to the second server-side application package.

Another aspect of the disclosed embodiments is a storage medium including program instructions executable by one or more processors that, when executed, cause the one or more processors to perform operations. The operations include receiving, from a remote computing device, an update request, the update request including a first signature corresponding to a client-side application package that is stored at the remote computing device. The operations also include identifying a first server-side application package using the first signature. The operations also include generating a differential update package using the first server-side application package and a second server-side application package as inputs. The differential update package, when applied to the client side application package, is operable to modify to the client-side application package such that it is functionally equivalent to the second server-side application package.

Another aspect of the disclosed embodiments is an apparatus that includes one or more processors and one or more memory devices for storing program instructions used by the one or more processors. The program instructions, when executed by the one or more processors, cause the one or more processors to receive, from a remote computing device, an update request, the update request including a first signature corresponding to a client-side application package that is stored at the remote computing device. The program instructions also cause the one or more processors to identify a first server-side application package using the first signature, and generate a differential update package using the first server-side application package and a second server-side application package as inputs, wherein the differential update package, when applied to the client side application package, is operable to modify to the client-side application package such that it is functionally equivalent to the second server-side application package.

Another aspect of the disclosed embodiments is a method that includes transmitting, from a computing device to one or more server computers, an update request corresponding to a client-side application package that is stored at the computing device, the client side application package contains a plurality of application components. The method also includes receiving a differential update package in response to the request, the differential update package including a plurality of deltas, wherein each delta corresponds to one of the application components contained in the client side application package. The method also includes applying the plurality of deltas to modify at least some of the application components from the plurality of application components.

Another aspect of the disclosed embodiments is a storage medium including program instructions executable by one or more processors that, when executed, cause the one or more processors to perform operations. The operations include transmitting, from a computing device to one or more server computers, an update request corresponding to a client-side application package that is stored at the computing device. The client side application package contains a plurality of application components. The operations also include receiving a differential update package in response to the request, the differential update package including a plurality of deltas, wherein each delta corresponds to one of the application components contained in the client side application package. The operations also include applying the plurality of deltas to modify at least some of the application components from the plurality of application components.

Another aspect of the disclosed embodiments is an apparatus that includes one or more processors and one or more memory devices for storing program instructions used by the one or more processors. The program instructions, when executed by the one or more processors, cause the one or more processors to transmit, from a computing device to one or more server computers, an update request corresponding to a client-side application package that is stored at the computing device, the client side application package contains a plurality of application components. The program instructions also cause the one or more processors to receive a differential update package in response to the request, the differential update package including a plurality of deltas, wherein each delta corresponds to one of the application components contained in the client side application package. The program instructions also cause the one or more processors to apply the plurality of deltas to modify at least some of the application components from the plurality of application components.

BRIEF DESCRIPTION OF THE DRAWINGS

The description herein makes reference to the accompanying drawings wherein like reference numerals refer to like parts throughout the several views, and wherein.

DETAILED DESCRIPTION

In the systems and methods described here, updates are applied to an application that is stored as an application package at a computing device. An application package can be, for example, a single file that contains all of the components of a software application, such as code, graphics, and/or other media files. One example of an application package is the Android application package file format, also known as the APK file format, which is used by the Android operating system.

A differential update patch is selected or created based on the version of the application that is installed at the remote computing device and the current version of the application. Creating the differential update patch can include selecting an application package file from a server-side repository based on a signature that is received from the remote computing device, so that the differential update patch is created using an application package file that is substantially identical to the one that is installed at the remote computing device, without transmitting the application package file itself to the server. Creating the differential update patch can include unpacking (e.g. decompressing) the application package for each of the versions of the application, and creating patching instructions that update the components of the binary update package individually. One example of a patching instruction is a binary data delta. To apply the differential update patch at the remote computing device, the application package at the remote computing device is unpacked, the differential update is applied to the individual components, for example, by applying a binary data delta to each of the individual components, the components are packed (e.g. compressed) to create an updated application package for the application.

Figure 1:
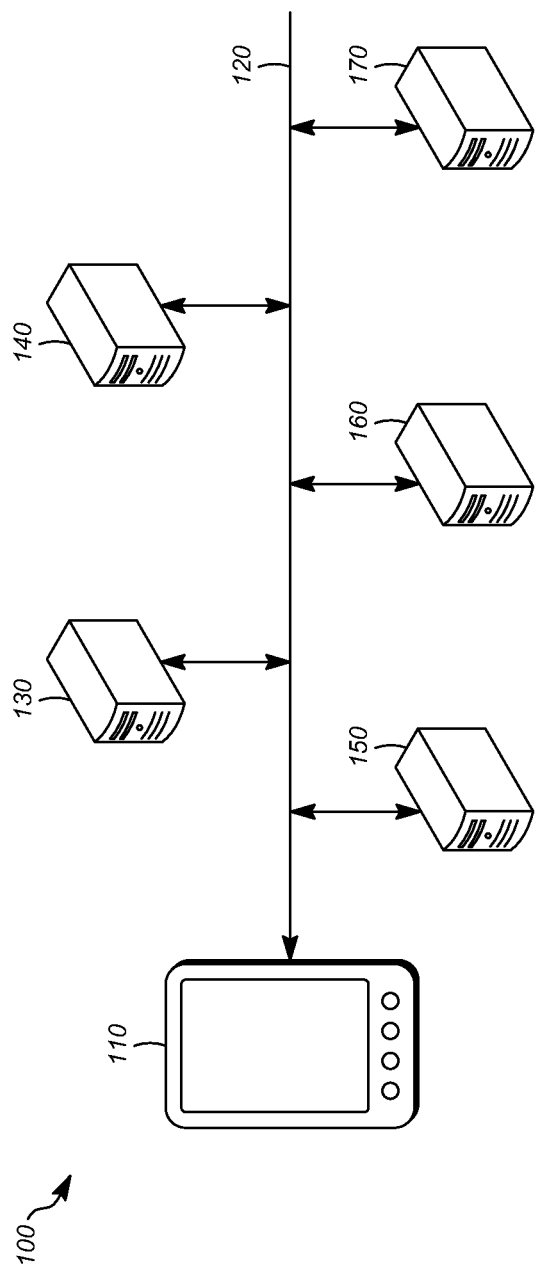
FIG. 1 is a block diagram of a system for installing applications remotely.

FIG. 1 is a block diagram of a system 100 in accordance with one implementation. The system 100 includes a computing device 110. The computing device 110 is connected to one or more server computers by a network 120. The one or more server computers can include an update manager 130, an update delivery service 140, a repository 150, a cache service 160, and a patch generator 170. All of these can be in communication with one another and with the computing device 110 via the network 120.

The computing device 110 can be a smart phone, tablet computer, laptop computer, or other mobile computing device that can connect to one or more server computers via the network 120. An application can be present and/or installed at the computing device 110 in the form of an application package file. An example of an application package file is a file that serves as a container for component files corresponding to the application. The application package file can be compressed and/or encrypted. In some implementations, the computing device 110 is operable to unpack (decompress) the application package, resulting in a plurality of component files corresponding to the application.

The network 120 can include multiple networks of varying types, including LANs, WANs, and the internet in any combination. Wired and/or wireless communications protocols can be used.

The update manager 130 is operable to receive a request for an update from the computing device 110. The request can identify a currently installed version of an application package and, optionally, can also identify a requested version of the application package. The currently installed version of the application and the requested version of the application can be identified in the request by signatures. The signatures can be unique or non-unique signatures in any suitable form and can be generated, for example, by an algorithm that will always generate the same output when given a specified input. In some implementations, the signatures can be fixed like alphanumeric strings that are many orders of magnitude shorter than the application package files which they correspond to. As any example, the signatures can be hash codes, such as an SHA256 digest. The request can also include additional information, such as hardware or software information corresponding to the computing device 110.

The update manager 130, using the information contained in the requested, can transmit information to the computing device 110. The information can include one or more options for updating the application, as will be discussed herein. The information can also include metadata regarding updating the application, such as storage space requirements for installation of the updated version of the application.

The update delivery service 140 is operable to cause transmission of an update package to the computing device 110. The update package can be in the form of a patch, also referred to herein as a differential update package, that is selected based on the currently installed version of the application package and the requested version of the application package. The transmission can be made using a repository 150 or a cache service 160.

The patch generator 170 is operable to generate a patch that can be applied at the computing device 110 to modify the application package file or the component files corresponding to the application. The patch corresponds to a specific pair of versions for the application. For example, where there are three versions of an application package that are designated v1, v2, and v3, a first patch can be generated that is applied to v1 to result in an updated application package that is functionally equivalent to v3, and a second patch can be generated that is applied to v2 to result in an updated application package that is functionally equivalent to v3.

A patch can be automatically generated by the patch generator without access to the prior version of the application package that is installed at the computing device 110 in response to the update request that is received from the computing device 110. The computing device 110 can transmit information that identifies the installed version of the application package. The information can be, as examples, a version number or signature, such as an SHA-1 hash or an SHA256 hash. A local copy of the corresponding application package is accessed by the patch generator 170. The signature can be used to identify a copy of the application package at the repository 150, which indicates that the application package located at the repository 150 is identical to the application package located at the mobile device 110, and thus can be used as a basis for generating an update package that can be applied to the application package at the mobile device 110.

Figure 2:
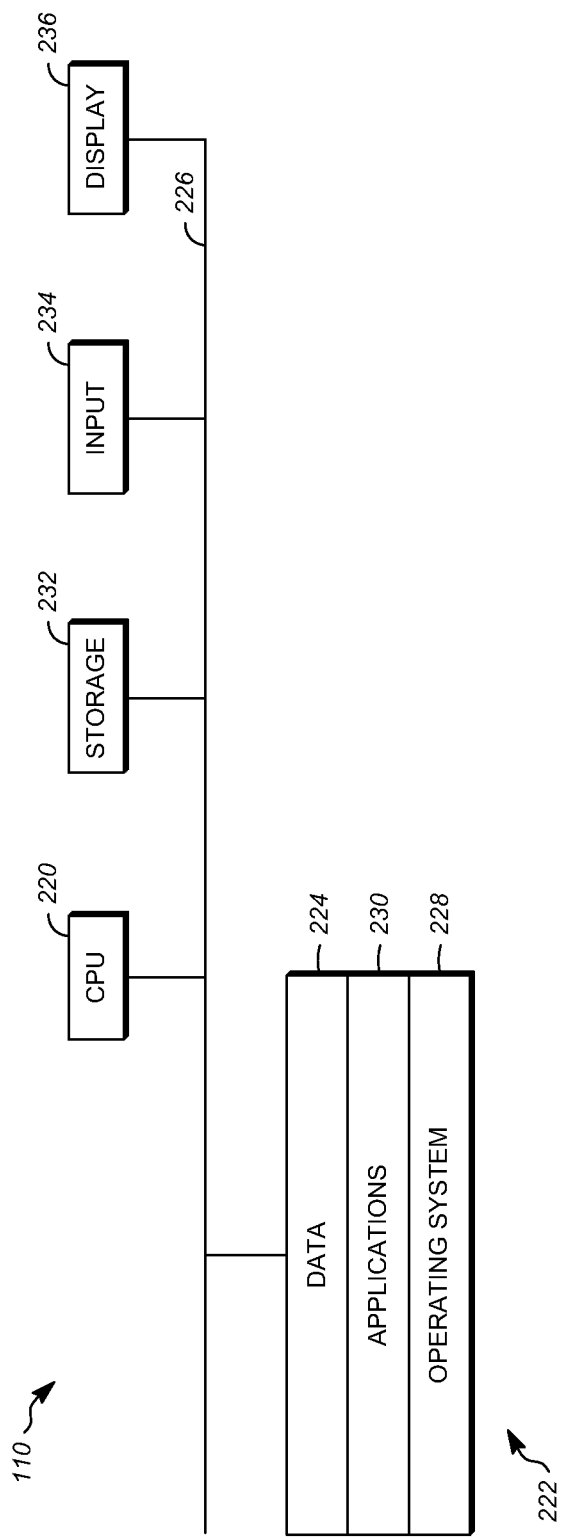
FIG. 2 is a block diagram showing an example of a hardware configuration for an example of a computing device.

FIG. 2 is a block diagram of an example of a hardware configuration for the computing device 110. A similar hardware configuration can be used for the update manager 130, the update delivery service 140, the repository 150, the cache service 160, and the patch generator 170.

The CPU 220 of the computing device 110 can be a conventional central processing unit. Alternatively, the CPU 220 can be any other type of device, or multiple devices, capable of manipulating or processing information now-existing or hereafter developed. Although the disclosed examples can be practiced with a single processor as shown, e.g. CPU 220, advantages in speed and efficiency can be achieved using more than one processor.

The computing device 110 can include memory 222, such as a random access memory device (RAM). Any other suitable type of storage device can be used as the memory 222. The memory 222 can include code and data 224 that can be accessed by the CPU 220 using a bus 226. The memory 222 can further include an operating system 228 and one or more application programs 230. The application programs 230 can include programs that permit the CPU 220 to perform the methods described here.

A storage device 232 can be optionally provided in the form of any suitable computer readable medium, such as a hard disc drive, a memory device, a flash drive or an optical drive. One or more input devices 234, such as a keyboard, a mouse, or a gesture sensitive input device, receive user inputs and can output signals or data indicative of the user inputs to the CPU 220. One or more output devices can be provided, such as a display device 236. The display device 236, such as liquid crystal display (LCD) or a cathode-ray tube (CRT), allows output to be presented to a user, for example, in response to receiving a video signal.

Although FIG. 1 depicts the CPU 220 and the memory 222 of the computing device 110 as being integrated into a single unit, other configurations can be utilized. The operations of the CPU 220 can be distributed across multiple machines (each machine having one or more of processors) which can be coupled directly or across a local area or other network. The memory 222 can be distributed across multiple machines such as network-based memory or memory in multiple machines performing the operations of the computing device 110. Although depicted here as a single bus, the bus 226 of the computing device 110 can be composed of multiple buses. Further, the storage device 232 can be directly coupled to the other components of the computing device 110 or can be accessed via a network and can comprise a single integrated unit such as a memory card or multiple units such as multiple memory cards. The computing device 110 can thus be implemented in a wide variety of configurations.

Figure 3:
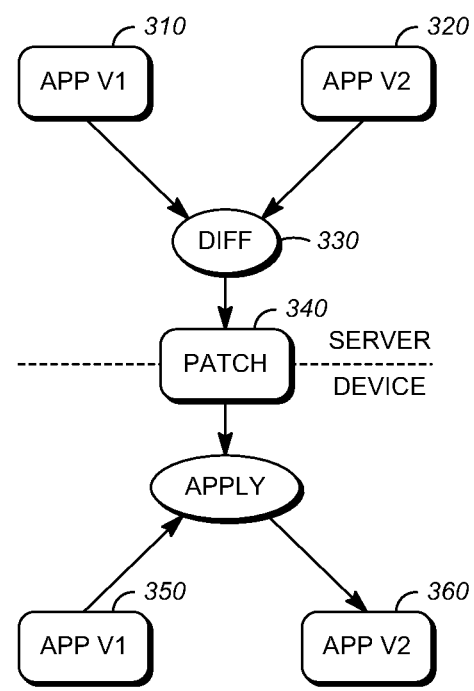
FIG. 3 is an illustration showing an example of updating an application package.

FIG. 3 is an illustration showing an example 300 of updating an application package. In most cases, this allows for a much reduced data download size as compared to downloading a complete copy of the updated version of an application package, which results in reduced bandwidth costs. In this example an original version 310 and an updated version 320 of an application are present on the server side, such as at the patch generator 170. Each of the original version 310 and the updated version 320 can be an application package file. A differential patch generation process 330 is performed using the original version 310 and the updated version 320 as inputs, and a patch 340 is generated as a result. The patch 340 is made based on differences between the application package files that are utilized as inputs. In the example shown in FIG. 3, the patch 340 can be generated without first unpacking or decompressing the application package files. Instead, the patch 340 can be generated by a binary data delta process that uses the application package files corresponding to the original version 310 and the updated 320 as inputs. The patch 340 includes binary data delta information that allows the updated version 320 to be recreated by applying the patch 340 to the original version 310.

Binary data delta generation is known. Examples of implementations of binary delta data generation that can be applied in the process 330 to produce the patch 340 include variations of the Xdelta algorithm and the bsdiff (suffix sorting) algorithm. Other algorithms can be applied in the process 300 instead of or in addition to binary data delta generation algorithms.

The patch 340 is transmitted from the one or more server computers to the computing device 110. The patch 340 is then applied to a client-side copy 350 of the original version 310 of the application (also referred to as a client side application package), which produces a client-side reproduction 360 of the updated version 320 of the application.

Figure 4:
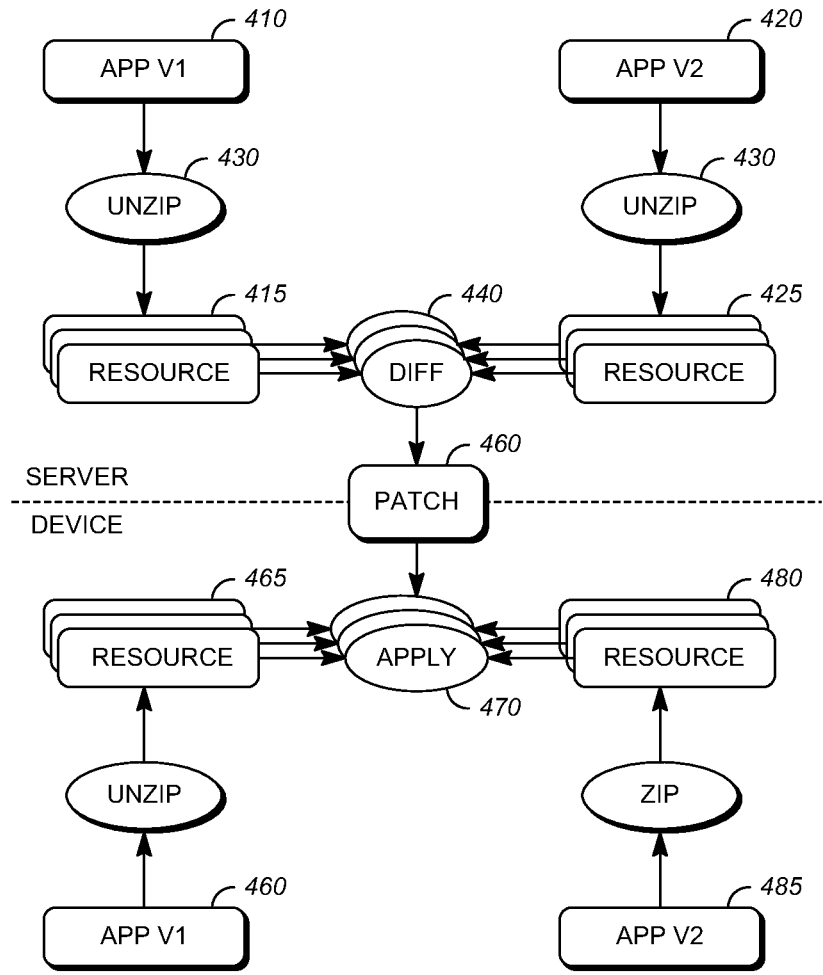
FIG. 4 is an illustration flowchart showing an example of updating the contents of an application package.

FIG. 4 is an illustration showing an example of updating the contents of an application package. In some situations, this can allow for a much reduced download size as compared to the example of FIG. 3. In this example, the application package files are unpacked into component files, binary data deltas are generated for each file pair, and then a patch archive zip file, which is sometimes referred to herein as a differential update package, is created that contains the individual binary data deltas.

In this example an original version 410 and an updated version 420 of an application are present on the server side, such as at the patch generator 170. Each of the original version 410 and the updated version 420 can be an application package file. An unzip process 430 is performed on each of the original version 410 and the updated version 420. Original resource files 415 and updated resource files 425 are generated as a result. A differential patch generation process 440 is applied to each pair of the original resource files 415 and the updated resource files 425, resulting in a binary data delta corresponding to each file pair. The results (deltas) are output and incorporated into a patch 450, which is transmitted from the one or more server computers to the computing device 110.

The computing device 110 unpacks (decompresses) a client side copy 460 of the original version of the application, resulting in client side original resource files 465. Deltas from the patch 450 are applied to the client side original resource files in patching operations 470, which results in client side updated resource files 480, which are packaged (compressed) into an application package file, which is a client side reproduction 485 of the updated version 420 of the application.

Figure 5:
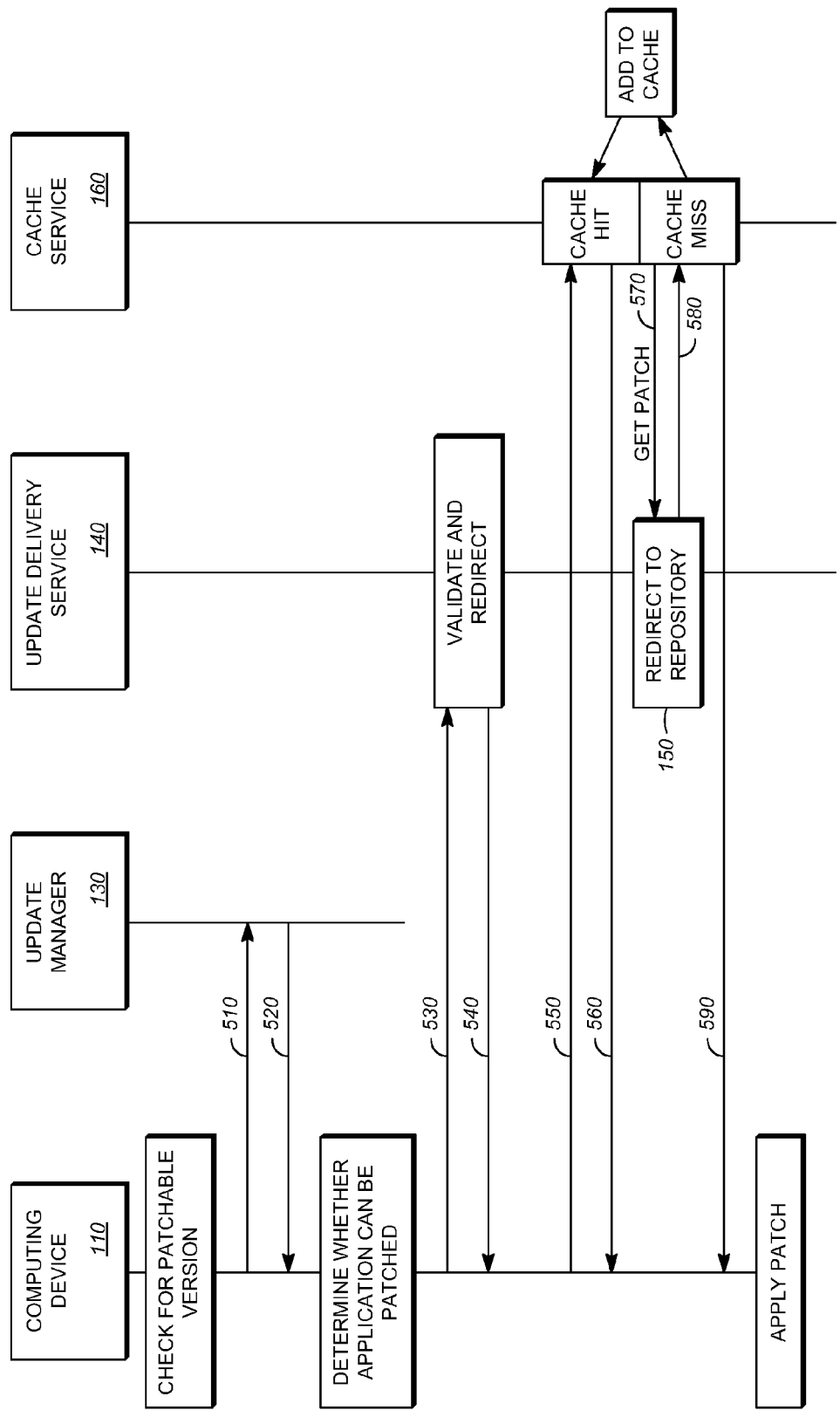
FIG. 5 is an illustration showing communications between a computing device and one or more server computers.

FIG. 5 is an illustration showing communications between a computing device and one or more server computers.

Initially, a request for an application is generated at the computing device 110. The request can be generated by execution of an application, in response to receipt of signals or data, or in response to user input. The request indicates a desired version of the application. The computing device determines whether a previous version of the application is currently installed. In transmission 510, the computing device sends information to the update manager 130 that identifies the currently installed version of the application (if available) and the desired version of the application.

In some implementations, the update manager 130 determines whether a patch exists corresponding to the installed and desired versions of the application (e.g. a patch to update from v1 to v3). The update manager 130 can respond, in transmission 520, with any or all of a URL for the patch (if available), a URL for the entire application package corresponding to the desired version of the application, and metadata relating to the patch. In other implementations, the update manager does not determine whether a patch exists corresponding to the installed and desired versions of the application, but instead generates and/or transmits to the computing device 110 a URL that can be used to request the patch if it exists. In such an implementation, when the patch is requested, it can be delivered if it exists or the complete application package file can be delivered when the patch is requested but does not exist using server-side redirection.

Based on the information received from the update manager 130, the computing device 110 determines whether the currently installed version of the application can be patched, based on, for example, whether a patch is available and/or the metadata relating to the patch. Other examples of situations where it is determined that the application cannot be patched include, the software at the computing device 110 not having enough functionality to support binary data deltas, the computing device 110 lacking sufficient available storage to store and process the binary data deltas, the currently installed application package cannot be read (e.g. protected) to apply the binary data deltas, where the currently installed application package does not match a package that is stored at the repository 150 (based on package signatures), and where the patched package does match the expected package (based on package signatures.

If the application cannot be patched, the computing device 110 can request the complete application package file corresponding to the updated version of the application, and can update the application by installing the complete application package file. If the application can be patched, a transmission 530 can be sent from the computing device 110 to the update delivery service, for example, using the patch URL that was received from the update manager. The update delivery service can validate the request and send a redirection transmission 540 to the computing device 110. The redirection transmission 540 causes the computing device 110 to attempt to retrieve the patch from the cache service 160 via a transmission 550 from the computing device 110 to the cache service 160. The transmission 550 can, for example, use a URL that was supplied by the update delivery service 140.

In response to the transmission 550, the cache service 160 attempts to locate the patch. If the patch is located (a "cache hit") it is transmitted to the computing device via transmission 560. Otherwise, the patch is requested from the repository 150 via transmission 570, and received at the cache service 160 from the repository via transmission 580. The patch is then stored at the cache service 160, and transmitted to the computing device 110 via transmission 560. If the patch cannot be located an error transmission 590 is sent to the computing device. In other implementations, the cache service 160 can be omitted, and the patch can be requested from and transmitted to the computing device 110 directly by the repository 150.

In response to receiving the patch, it is applied at the computing device 110, for example, in the manner described in connection with either of FIG. 3 or FIG. 4.

Figure 6:
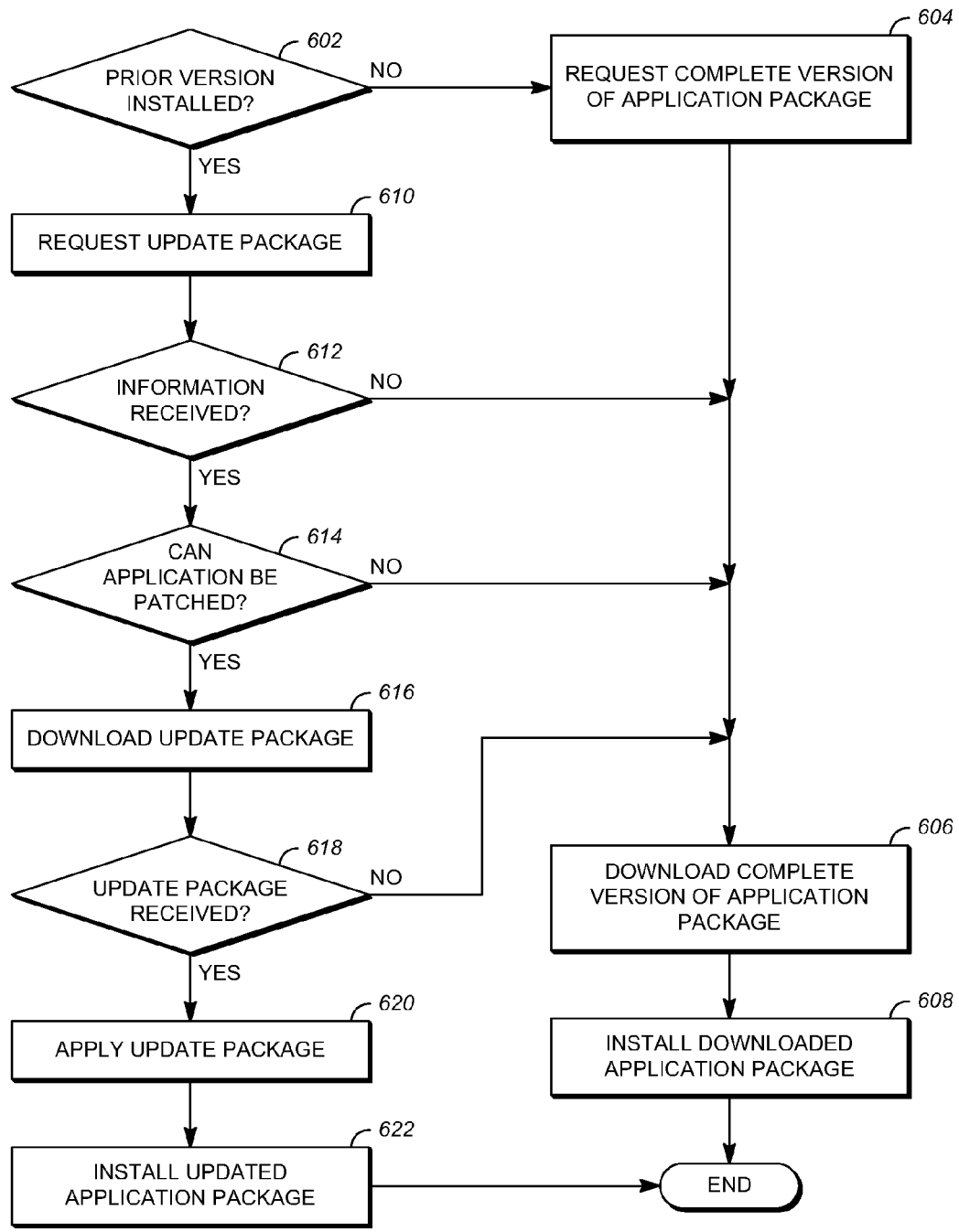
FIG. 6 is a flowchart showing a first example of a process for updating applications.

FIG. 6 is a flowchart showing an example of a process 600 for updating applications. The operations described in connection with the process 600 can be performed at the computing device 110. The process 600 can be embodied in the form of computer executable program instructions that are stored on a storage medium or storage device such as the memory 222 of the computing device 110, which can, in some examples, be a non-transitory computer-readable storage medium or storage device. When executed by a processor, such as the CPU 220 of the computing device 110, the instructions cause the CPU 220 to perform the operations that will be described herein with reference to the process 600.

Process 600 can be performed at the computing device 110 in response to a request for installation of an application, as discussed in connection with FIG. 5.

At operation 602, a determination is made as to whether a prior version of the requested application is installed at the computing device 110. If a prior version is not installed, a delivery of a complete version of the application package is requested at operation 604. The complete version is downloaded at operation 606, and then installed at operation 608.

If, at operation 602, it is determined that a prior version of the application is installed, the process advances to operation 610, where an update package is requested. This can be done, for example, by transmitting information from the computing device 110 to the one or more server computers that identifies the installed version of the application and the requested version of the application.

At operation 612, the computing device determines whether information regarding the update package has been received. The information can include, for example, a URL for the update package and metadata associated with the updated package. If not, the process proceeds to operation 606. If the information, such as the patch URL and metadata, is received, a determination is made at operation 614 as to whether the application should be patched. This can be based on the metadata. For example, if patching using the update package would require more storage space than is available, patching will not be performed. Other criteria can be used. If the computing device determines that the application should not be patched, the process proceeds to operation 606. Otherwise the process proceeds to operation 616.

The patch is downloaded at operation 616. If downloading fails, patching is aborted at operation 618 and the complete application package is downloaded at operation 606. If downloading succeeds, the update package is applied at operation 620 and the updated application package that is generated as a result of patching is installed at operation 622.

Figure 7:
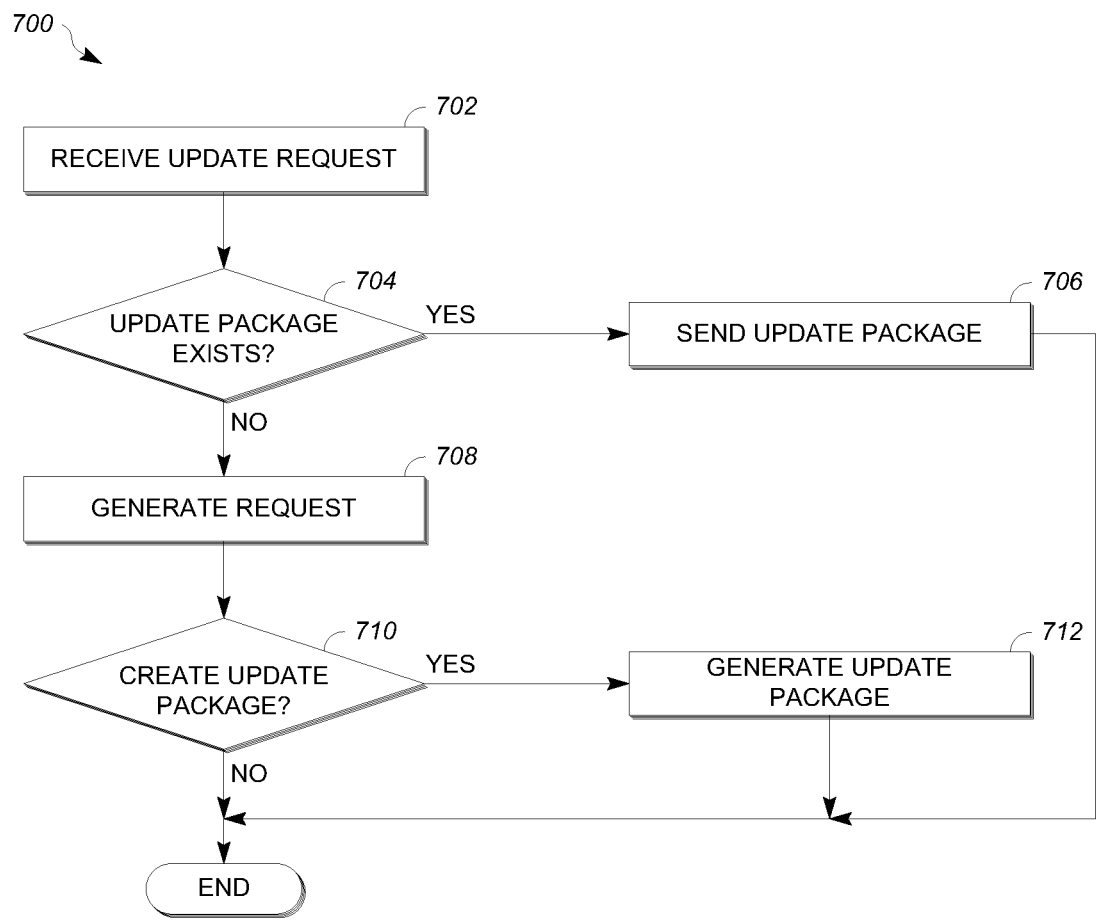
FIG. 7 is a flowchart showing an example of process for generating differential patches.

FIG. 7 is a flowchart showing an example of process 700 for generating differential patches. The operations described in connection with the process 700 can be performed at one or more server computers such as any or all of the update manager 130, the update delivery service 140, the repository 150, the cache service 160, and the patch generator 170. Where an operation is described as being performed by one or more computers, it is completed when it is performed by one computer. The process 700 can be embodied in the form of computer executable program instructions that are stored on a storage medium or storage device such as the memory 222 of the computing device 110, which can, in some examples, be a non-transitory computer-readable storage medium or storage device. When executed by a processor, such as a CPU, the instructions cause the processor to perform the operations that will be described herein with reference to the process 700.

At operation 702, an update request is received from a the computing device 110 at one or more server computers. The update request can include a first version identifier and a second version identifier. The first version identifier corresponds to a software application installed on the computing device 110 and the second version identifier corresponds to a subsequent version of the software application At operation 704, a determination is made at the one or more server computers as to whether an update package exists corresponding to the first version identifier and a second version identifier. If the patch exists the process proceeds to operation 706, where the updated package is transmitted to the computing device 110. If the updated package does not exist, a request for the updated package is generated at operation 708. Concurrently, the one or more server computers can transmit a complete copy of the application package or an instruction to download a complete copy of the application package to the computing device 110.

At operation 710, a determination is made as to whether to automatically create the update package that was requested. The update package can be created to serve an anticipated demand for the patch by future users, if it is determined that the number of downloads and download size reduction justify creation of the update package. For example, either or both of these can be compared to thresholds to make this determination. Thus, whether to generate the update package can be based on one or more of a number of requests for creation of the update package and a computed download size reduction. If it is determined that the update package is to be created, the update package can be generated at operation 712. This can be performed by the patch generator 170.

Other factors can be used to determine whether to create the update package that was requested. Any relevant factors can be utilized. For example, basing creation on the number of requests ensures that deltas are not generated and stored for rarely requested update package. If a generation of a particular delta has previously failed, this can be tracked so that it is not attempted again. Also, a tunable decision limit can be used to determine whether an update package should be used for a particular upgrade scenario as opposed to processing the full application package. If the size of an update package is larger than a certain percentage, for example, 80% of the size of the full package, the full version of the application package can be sent instead of generating the update package.

The patch generator 170 can include multiple servers in multiple datacenters for reliability. A centralized statistics system can be used to track the need for delta generation, and ensure that each delta is only generated once by one of the available distributed delta makers of the patch generator 170. A centralized, expiring lock can be used to avoid duplicate generation of identical update packages.

The computing device and the one or more server computers 130, 140, 150, 160 and 170 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably.

In some implementations, the operations of the computing device 110 and the one or more server computers 130, 140, 150, 160 and 170 can be combined into a single computer. In other implementations, the functions of each of the computing device and the one or more server computers 130, 140, 150, 160 and 170 can be distributed across a number of different devices. Although illustrated for simplicity as unitary machines, it is understood that the one or more server computers 130, 140, 150, 160 and 170 are not necessarily implemented using a single processor, or a single physical machine. Moreover, although features may be described above or claimed as acting in certain combinations, one or more features of a combination can in some cases be excised from the combination, and the combination may be directed to a sub-combination or variation of a sub-combination.

In another example, the computing device 110 and the one or more server computers 130, 140, 150, 160 and 170 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of the embodiments of the disclosure can take the form of a computer program product accessible from, for example, a storage device or storage medium such as a non-transitory computer-usable or computer-readable medium. A storage device or storage medium can be any device that can, for example, tangibly contain, store, communicate, or transport the program for use by or in connection with any processor. The storage device or storage medium can be, for example, an electronic device, magnetic device, optical device, electromagnetic device, or a semiconductor device. Other suitable devices and mediums are also available.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
receiving, by a server-side application repository, from a remote computing device, an update request, the update request including a first signature that uniquely identifies a client-side application package, consisting essentially of components of a single software application, and including information identifying an updated version of the client-side application package;
identifying a number of requests to download a differential update package associated with the client-side application package;
identifying a size of the differential update package;
identifying, in response to receiving the update request, and based on one or both of the number of requests to download the differential update package exceeding a threshold value and the size of the differential update package exceeding a certain percentage of a size of the updated version of the client-side application package, whether to generate a differential update package, wherein generating the differential update package comprises:
comparing, via the server-side application repository, the first signature to a second signature that identifies a first server-side application package that is identical to the client-side application package; and
using the first server-side application package and a second server-side application package as inputs to create the differential update package, wherein the second server-side application package is identified based on the information identifying an updated version of the client-side application package, and
wherein the differential update package, when applied to the client-side application package, is operable to modify the client-side application package such that it is functionally equivalent to the second server-side application package.

2. The method of claim 1, further comprising:
transmitting the differential update package to the remote computing device subsequent to generating the differential update package.

3. The method of claim 1, wherein the update request includes one or more system characteristics describing the remote computing device.

4. The method of claim 1, wherein the first signature is a hash code.

5. A non-transitory storage device including program instructions executable by one or more processors that, when executed, cause the one or more processors to perform operations, the operations comprising:
receiving, by a server-side application repository, from a remote computing device, an update request, the update request including a first signature that uniquely identifies a client-side application package, consisting essentially of components of a single software application, and including information identifying an updated version of the client-side application package;
identifying a number of requests to download a differential update package associated with the client-side application package;
identifying a size of the differential update package;
identifying, in response to receiving the update request, and based on one or both of the number of requests to download the differential update package exceeding a threshold value and the size of the differential update package exceeding a certain percentage of a size of the updated version of the client-side application package, whether to generate a differential update package, wherein generating the differential update package comprises:
comparing, via the server-side application repository, the first signature to a second signature that identifies a first server-side application package that is identical to the client-side application package; and
using the first server-side application package and a second server-side application package as inputs to create the differential update package, wherein the second server-side application package is identified based on the information identifying an updated version of the client-side application package, and
wherein the differential update package, when applied to the client-side application package, is operable to modify the client-side application package such that it is functionally equivalent to the second server-side application package.

6. The non-transitory storage device of claim 5, the operations further comprising:
transmitting the differential update package to the remote computing device subsequent to generating the differential update package.

7. The non-transitory storage device of claim 5, wherein the update request includes one or more system characteristics describing the remote computing device.

8. The non-transitory storage device of claim 5, wherein the first signature is a hash code.

9. An apparatus, comprising:
one or more processors; and
one or more memory devices for storing program instructions used by the one or more processors, wherein the program instructions, when executed by the one or more processors, cause the one or more processors to:
receive, by a server-side application repository, from a remote computing device, an update request, the update request including a first signature that uniquely identifies a client-side application package, consisting essentially of components of a single software application, and including information identifying an updated version of the client-side application package;
identify a number of requests to download a differential update package associated with the client-side application package;
identify a size of the differential update package;
identify, in response to receiving the update request, and based on one or both of the number of requests to download the differential update package exceeding a threshold value and the size of the differential update package exceeding a certain percentage of a size of the updated version of the client-side application package, whether to generate a differential update package, wherein when the one or more processors are to generate the differential update package, the one or more processors are to:
compare the first signature to a second signature that identifies a first server-side application package that is identical to the client-side application package; and
use the first server-side application package and a second server-side application package as inputs to create the differential update package, wherein the second server-side application package is identified based on the information identifying an updated version of the client-side application package, and
wherein the differential update package, when applied to the client-side application package, is operable to modify the client-side application package such that it is functionally equivalent to the second server-side application package.

10. The apparatus of claim 9, wherein the program instructions further cause the one or more processors to:
transmit the differential update package to the remote computing device subsequent to generating the differential update package.

11. The apparatus of claim 9, wherein the update request includes one or more system characteristics describing the remote computing device and the one or more predetermined criteria include the one or more system characteristics.

12. The apparatus of claim 9, wherein the first signature is a hash code.

* * * * *